H. SCHAAKE.
SHINGLE MACHINE TABLE.
APPLICATION FILED AUG. 4, 1920.
1,389,321.
Patented Aug. 30, 1921.
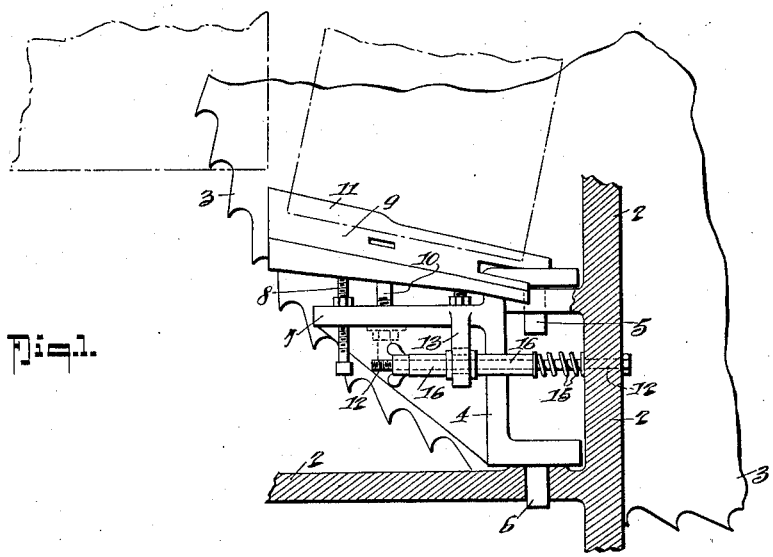
Fig. 1.
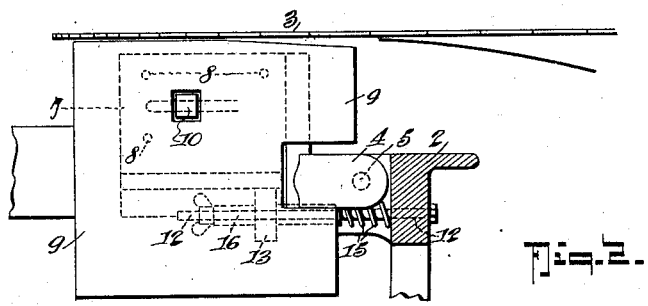
Fig. 2.
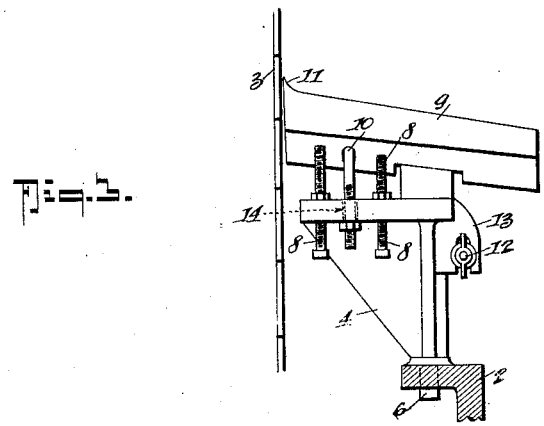
Fig. 3.
Inventor
Henry Schaake.
By Fred G. Dieterich
Attorneys

UNITED STATES PATENT OFFICE.

HENRY SCHAAKE, OF VANCOUVER, BRITISH COLUMBIA, CANADA.

SHINGLE-MACHINE TABLE.

1,389,321.   Specification of Letters Patent.   Patented Aug. 30, 1921.

Application filed August 4, 1920. Serial No. 401,249.

*To all whom it may concern:*

Be it known that I, HENRY SCHAAKE, citizen of the Dominion of Canada, residing at Vancouver, in the Province of British Columbia, Canada, have invented certain new and useful Improvements in Shingle-Machine Tables, of which the following is a specification.

This invention relates to what is known as the table of a shingle cutting saw, that is, it is designed to receive the shingles as they are cut from the block, and divert them from the face of the saw plate to be passed therefrom for edging or bundling as desired.

The improvements are directed to the provision of a means for adjusting the upper surface of the table to any desired angle or angles in relation to the saw plate. Also to a provision enabling a sliver shingle that might slip down between the edge of the table and the saw plate to free itself or to be readily freed by the operator without disturbing the adjusted setting of the table.

The table is also supported from the frame of the machine in a manner that enables it to be quickly removed to afford access to the saw plate, and as readily replaced without the adjustment of the table being disturbed.

These and other features of improvement are fully set forth in the following specification, reference being made to the drawings by which it is accompanied, in which:

Figure 1 is an elevation of the table and its connected parts looking toward the face of the saw plate.

Fig. 2 is a plan view of the same, and

Fig. 3, an elevation looking toward the edge of the saw plate.

In these drawings 2 represents the frame of the machine and 3 the circular saw plate mounted therein. In the frame 2 is pivotally mounted on upper and lower pins 5 and 6 a supporting bracket 4 having a projection 7 toward the outer part of the saw plate.

This projection 7 is provided with three adjusting screws 8, on the upper ends of which is carried the table 9 which is secured in any desired adjustment by a bolt 10, the head of which is recessed into the upper face of the table 9, and passes through an aperture 14 in the projection 7 of the bracket 4, which aperture is elongated parallel to the saw plate.

The edge of the table 9 which is toward the saw plate has an upwardly projecting ridge 11 which slopes quickly away from the plate so as to divert a shingle from the face of the plate as soon as it is cut. The upper face of the table is also sloped downward from the saw plate and downward below the axis of the saw spindle, so that, as shown in Fig. 1, the cut shingle will fall clear of shingle block and saw plate.

So adjusted and secured in relation to the saw plate the table may be swung on the pivots 5 and 6 away from the saw and may be readily lifted out of the pivot bearings 5 and 6 without disturbing the adjusted setting of the table.

The table 9 is limited in the movement of its edge 11 toward the saw plate 3 by a bolt 12, which is passed through the frame 2 adjacent the pivot pins 5 and 6, and through an open ended aperture in a projection 13 from the side of the bracket 4, 7. The bracket is normally held at the limit of its movement toward the saw plate by a compression spring 15 coiled on the bolt between the frame 2 and a sleeve 16 on the bolt between the spring and the projection 13 of the bracket.

The bolt 12 and spring 15 will thus adjustably limit the movement of the edge of the table 9 toward the saw plate and will resiliently hold it at that limit, so that if a shingle sliver gets between the edge of the table and the saw plate it may either free itself by forcing back the table against the resistance of the spring 15 or the table may be drawn back by the operator to let the sliver fall through, which act may be quickly done without disturbing any adjustment, the spring thereafter carrying the table back to its proper position in relation to the saw plate.

The bracket 4 and all its connected parts may be quickly removed when required from the pin holes of 5 and 6, the open ended aperture in the lug 13 permitting it to be withdrawn from the bolt 12 without disturbing the adjustment of the spring.

Having now particularly described my invention, I hereby declare that what I claim as new and desire to be protected in by Letters Patent, is:

1. A table for a shingle cutting machine, said table comprising a bracket pivotally mounted in the frame of the machine to turn to and from the plane of the saw plate, a table top adjustably mounted on the bracket with one edge close to the plane of the saw plate, means for securing the top in any desired position of adjustment, means limiting movement of the table top toward the plane of the saw plate, and means tending to hold it against that limit.

2. A table for a shingle cutting machine, said table comprising a bracket pivotally mounted to turn on an upright axis to and from the plane of the saw plate, an adjustable stop limiting movement of the bracket toward the saw plate, a spring holding the bracket against the limiting stop, a table top adjustably supported on the bracket at any desired angle in relation to the saw plate, means for securing the table on the adjustment, said securing means permitting adjustment of the table top to the diameter of the saw plate.

3. A table for a shingle cutting machine, said table comprising a bracket having downwardly projecting pins in a common axis which pins fit apertures provided in the machine frame that the bracket may be moved on a vertical axis to and from the saw plate, means limiting movement of the bracket toward the saw plate, a spring tending to hold the bracket at that limit, a table top adjustably secured on the bracket the general surface of which table slopes downward from the plane of the saw plate and downward below its axis.

4. A table for a shingle cutting machine, said table comprising a bracket pivotally mounted in the frame of the machine to turn on an upright axis to and from the plane of the saw plate, means for limiting movement of the bracket toward the plane of the saw plate, a spring tending to hold it against that limit, and a table top adjustably mounted on the bracket with one edge close to the plane of the saw plate and sloping quickly downward from that plane to the general plane of the table, the general plane of the table sloping downward from the plane of the saw plate and downward below the axis of the saw.

5. A table for a shingle cutting machine, said table comprising a bracket pivotally mounted in the frame of the machine to turn on an upright axis to and from the plane of the saw plate, adjustable means relatively permanently connected to the machine for limiting movement of the bracket toward the saw plate, a spring on each adjusting means holding the bracket at the desired limit toward the saw, adjusting screws threaded in the bracket, a table top seated on the adjusting screws, a bolt through the table and bracket securing the table on the adjusting screws the general plane of said table sloping downward from the plane of the saw and downward below the axis of the saw, the edge of said table adjacent the saw plate being acutely angled downward from the plate.

6. A table for a shingle cutting machine, said table comprising a bracket having downwardly projecting pins on a common axis adapted to fit corresponding apertures in the machine frame and be readily removable therefrom, means limiting movement of the bracket on the pivot to and from the saw plate, supporting screws threaded in the bracket, a table top supported on the screws the edge of which top toward the saw plate has an acute edge sloping downward from the plane of the plate, a bolt securing the table top to the bracket in any desired position of angular adjustment.

In testimony whereof I affix my signature.

HENRY SCHAAKE.